United States Patent
Kato et al.

(10) Patent No.: US 11,590,942 B2
(45) Date of Patent: *Feb. 28, 2023

(54) BRAKING FORCE CONTROL APPARATUS FOR A VEHICLE

(71) Applicant: TOYOTA JIDOSHA KABUSHIKI KAISHA, Toyota (JP)

(72) Inventors: Hidehisa Kato, Shizuoka-ken (JP); Masahiro Hara, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 474 days.

This patent is subject to a terminal disclaimer.

(21) Appl. No.: 16/809,035

(22) Filed: Mar. 4, 2020

(65) Prior Publication Data
US 2020/0282963 A1 Sep. 10, 2020

(30) Foreign Application Priority Data
Mar. 7, 2019 (JP) ............................. JP2019-041900

(51) Int. Cl.
*B60T 8/175* (2006.01)
*B60T 17/22* (2006.01)
*B60T 11/16* (2006.01)
*B60T 8/172* (2006.01)

(52) U.S. Cl.
CPC .............. *B60T 8/175* (2013.01); *B60T 8/172* (2013.01); *B60T 11/16* (2013.01); *B60T 17/22* (2013.01); *B60T 2270/402* (2013.01)

(58) Field of Classification Search
CPC ...................................................... B60T 8/175
See application file for complete search history.

(56) References Cited

U.S. PATENT DOCUMENTS

| 2015/0175144 A1* | 6/2015 | Watanabe ............. B60T 13/686 303/10 |
| 2017/0182990 A1* | 6/2017 | Ninoyu ................... B60T 7/042 |
| 2020/0282964 A1 | 9/2020 | Shindo | |
| 2021/0031741 A1* | 2/2021 | Alford .................. B60T 11/165 |

FOREIGN PATENT DOCUMENTS

| JP | 2006-327474 A | 12/2006 |
| JP | 2012-153266 A | 8/2012 |
| JP | 2015-143058 A | 8/2015 |
| JP | 2017-052305 A | 3/2017 |

* cited by examiner

*Primary Examiner* — Imran K Mustafa
(74) *Attorney, Agent, or Firm* — Sughrue Mion, PLLC

(57) ABSTRACT

A braking force control apparatus has an upstream braking actuator for generating an upstream pressure common to four wheels, a downstream braking actuator individually controlling braking pressures supplied to braking force generating devices of the wheels using the upstream pressure, and a control unit. When the downstream braking actuator is abnormal and the upstream pressure can be supplied to the braking force generating devices, but a braking pressure of any one of the wheels cannot be normally reduced, the control unit selects higher one of the target braking pressures of the left and right front wheels and higher one of the left and right rear wheels, determines lower one of the two selected target braking pressures as a backup target upstream pressure, and controls the upstream braking actuator such that the upstream pressure becomes the backup target upstream pressure.

7 Claims, 4 Drawing Sheets

BRAKING FORCE CONTROL APPARATUS FOR A VEHICLE

CROSS-REFERENCE TO RELATED APPLICATION

The disclosures of Japanese Patent Application No. JP2019-41900 filed on Mar. 7, 2019, the content of which is hereby incorporated by reference in its entirety into this application.

BACKGROUND

1. Technical Field

The present disclosure relates to a braking force control apparatus for a vehicle such as an automobile.

2. Description of the Related Art

For example, as described in Japanese Patent Application Laid-open Publication No. 2015-143058, a braking force control apparatus having an upstream braking actuator that generates a common upstream pressure for left and right front wheels and left and right rear wheels, a downstream braking actuator, and a control unit that controls these actuators are known. The upstream braking actuator includes a master cylinder device driven by a driver's braking operation. The downstream braking actuator includes a pressure increasing-holding valve and a pressure decreasing valve provided corresponding to each wheel, and controls a braking pressure supplied to a braking force generating device of each wheel using the upstream pressure by the pressure increasing-holding valve and the pressure decreasing valve.

Anti-skid control is as well performed in a vehicle equipped with a braking force control apparatus having an upstream braking actuator and a downstream braking actuator so that a braking slip of each wheel does not become excessive. In the anti-skid control, a braking pressure supplied to a braking force generating device of a wheel having a large braking slip is individually controlled by the corresponding pressure increasing-holding valve and pressure decreasing valve.

If an abnormality occurs in a pressure increasing-holding valve or a pressure decreasing valve of any one of the wheels, a braking pressure of the relevant wheel cannot be normally controlled. In a conventional braking force control apparatus, for example, when an abnormality occurs in a pressure decreasing valve of any one of the wheels and it becomes impossible to reduce the braking pressure of the relevant wheel, the anti-skid control is stopped. Therefore, it is impossible to prevent a braking slip of the wheel from becoming excessive in a situation where a braking operation amount of a driver is excessive.

Even if an abnormality occurs in the downstream braking actuator, when the abnormality is an abnormality that allows to supply the upstream pressure from the upstream braking actuator to the braking force generating devices of the respective wheels but cannot reduce a braking pressure of any one of the wheels (referred to as "specific abnormality" as necessary), it is possible to reduce a possibility that the braking slips of the wheels become excessive by controlling the upstream pressure. Conventionally, no study has been made to reduce a possibility that a braking slip of a wheel becomes excessive by the control of the upstream pressure when the specific abnormality occurs in the downstream braking actuator. There is neither description nor suggestion in the above-mentioned publication.

SUMMARY

The present disclosure provides a braking force control apparatus for a vehicle which is improved to reduce a possibility that a braking slip of a wheel becomes excessive by the control of an upstream pressure when a specific abnormality in which the upstream pressure can be supplied to braking force generating devices but a braking pressure of a wheel cannot be reduced occurs in a downstream braking actuator.

According to the present disclosure, a braking force control apparatus for a vehicle is provided which has an upstream braking actuator that includes a master cylinder device driven by braking operation of a driver and is configured to generate an upstream pressure common to left and right front wheels and left and right rear wheels, a downstream braking actuator that is configured to individually control braking pressures supplied to braking force generators of the left and right front wheels and the left and right rear wheels using the upstream pressure, and a control unit that controls the upstream braking actuator and the downstream braking actuator;

the control unit is configured to normally control the upstream braking actuator such that the upstream pressure becomes a pressure in the master cylinder device, and control the downstream braking actuator such that braking pressures of the wheels become the upstream pressure; and the control unit is configured to, when an anti-skid control start condition is satisfied for any of the wheels, perform anti-skid control for controlling the downstream braking actuator such that the braking pressure of the wheel becomes a target braking pressure of the anti-skid control for keeping a degree of braking slip of the wheel within a predetermined range until an anti-skid control end condition is satisfied.

The control unit is configured to, when a specific abnormality occurs in the downstream braking actuator in which the upstream pressure can be supplied from the upstream braking actuator to the braking force generators of the wheels but a braking pressure of any wheel cannot be reduced, perform backup control in which the control unit selects higher one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure.

According to the above configuration, when a specific abnormality occurs in the downstream braking actuator, higher one of the target braking pressures of the left and right front wheels and higher one of the target braking pressures of the left and right rear wheels are selected. Further, lower one of the two selected target braking pressures is determined as a backup target upstream pressure, and the upstream braking actuator is controlled such that the upstream pressure becomes the backup target upstream pressure.

Therefore, as compared to where, when a specific abnormality occurs in the downstream braking actuator, the downstream braking actuator is controlled in the non-control mode, and the braking pressure of each wheel is controlled to become the pressure in the master cylinder device, it is possible to reduce the possibility that the braking pressures becomes excessive and braking slips of the wheels becomes excessive when an amount of braking operation by a driver is large.

Further, a braking force of the entire vehicle can be increased as compared to the case where lower one of the target braking pressures of the left and right front wheels is selected, lower one of the target braking pressures of the left and right rear wheels is selected, and lower one of the two selected target braking pressures is determined as a backup target upstream pressure. Conversely, a braking force of the entire vehicle can be decreased as compared to the case where higher one of the target braking pressures of the left and right front wheels is selected, higher one of the target braking pressures of the left and right rear wheels is selected, and higher one of the two selected target braking pressures is determined as a backup target upstream pressure. Therefore, it is possible to reduce the possibility that the stability of the vehicle is lowered due to an excessive braking force of the entire vehicle while satisfying the driver's braking request as much as possible.

Note that, in both of the selection of higher one of the target braking pressures and the selection of lower one of the target braking pressures, when the two target braking pressures to be selected are the same, the same target braking pressure is selected.

In one aspect of the present disclosure, the control unit is configured to select lower one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is unstable and the vehicle is not turning.

According to the above aspect, lower one of the target braking pressures of the left and right front wheels and higher one of the target braking pressures of the left and right rear wheels are selected, and lower one of the two selected target braking pressures is determined as a backup target upstream pressure when a running state of the vehicle is unstable and the vehicle is not turning. Therefore, as compared to where lower one of the target braking pressures of the left and right rear wheels is selected, it is possible to increase the braking force of the rear wheels and effectively satisfy the driver's braking request. Since the vehicle is traveling in an unstable traveling state but is not turning, the traveling stability of the vehicle is not substantially reduced even if the braking force of the rear wheels is increased.

In another aspect of the present disclosure, the control unit is configured to select lower one of the target braking pressures of the left and right front wheels and lower one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is unstable and the vehicle is turning.

According to the above aspect, when the running state of the vehicle is unstable and the vehicle is turning, lower one of the target braking pressures of the left and right front wheels and lower one of the target braking pressures of the left and right rear wheels are selected, and lower one of the two selected target braking pressures is determined as a backup target upstream pressure. Therefore, as compared to where higher one of the target braking pressures of the left and right rear wheel is selected, the braking force of the rear wheels can be lowered, and the possibility that the running stability during turning of the vehicle can be further reduced.

Further, in another aspect of the present disclosure, the control unit is configured to select higher one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is stable and the vehicle is turning.

According to the above aspect, when a running state of the vehicle is stable and the vehicle is turning, higher one of the target braking pressures of the left and right front wheels and higher one of the target braking pressures of the left and right rear wheels are selected, and lower one of the two selected target braking pressures is determined as a backup target upstream pressure. Therefore, as compared to where higher one of the target braking pressures of the left and right front wheels and lower one of the target braking pressures of the left and right rear wheels are selected, the braking force of the rear wheels can be increased, and the possibility that the driver's braking request is not satisfied can be reduced. Since the vehicle is turning in a stable running state and lower one of the two selected target braking pressures is selected, although higher one of the target braking pressures of the left and right rear wheels is selected, the stable turning state of the vehicle is not impaired.

Further, in another aspect of the present disclosure, the control unit is configured to select higher one of the target braking pressures of the left and right front wheels and higher one of the target braking pressures of the left and right rear wheels, determines higher one of the two selected target braking pressures as a backup target upstream pressure, and controls the upstream braking actuator such that the upstream pressure becomes the backup target upstream pressure when a running state of the vehicle is stable, the vehicle is not turning and a vehicle speed is equal to or lower than a reference value.

According to the above aspect, when a running state of the vehicle is stable, the vehicle is not turning and a vehicle speed is equal to or tower than a reference value, higher one of the target braking pressures of the left and right front wheels and higher one of the target braking pressures of the left and right rear wheels are selected, and higher one of the two selected target braking pressures is determined as a backup target upstream pressure. Therefore, as compared to where lower one of the two selected target braking pressures is determined as a backup target upstream pressure, the braking force of the entire vehicle can be increased and the driver's braking request can be satisfied more effectively.

Further, in another aspect of the present disclosure, the control unit is configured to select higher one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is stable, the vehicle is not turning and a vehicle speed is higher than a reference value.

According to the above aspect, when a running state of the vehicle is stable, the vehicle is not turning and a vehicle speed is higher than a reference value, higher one of the target braking pressures of the left and right front wheels and higher one of the target braking pressures of the left and right rear wheels are selected, and lower one of the two selected target braking pressures is determined as a backup target upstream pressure. Therefore, as compared to where higher one of the two selected target braking pressures is determined as a backup target upstream pressure, the possibility that the braking pressures become excessive and the braking slips of the wheels become excessive can be reduced.

Further, in another aspect of the present disclosure, the upstream braking actuator includes a hydraulic pressure supply source, master cut valves, and an upstream pressure control valve in addition to the master cylinder device, and the upstream pressure control valve is configured to increase the upstream pressure by supplying hydraulic liquid from the hydraulic pressure supply source to the downstream braking actuator when increasing the upstream pressure, to hold the upstream pressure by shutting off a communication between the hydraulic pressure supply source and the downstream braking actuator when holding the upstream pressure, and to decrease the upstream pressure by discharging hydraulic liquid from the downstream braking actuator to the hydraulic pressure supply source when decreasing the upstream pressure.

According to the above aspect, when it is necessary to increase the upstream pressure, the upstream pressure can be increased by controlling the upstream pressure control valve, when the upstream pressure needs to be hold, the upstream pressure can be hold by controlling the upstream pressure control valve, and when it is necessary to reduce the upstream pressure, the upstream pressure can be reduced by controlling the upstream pressure control valve.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
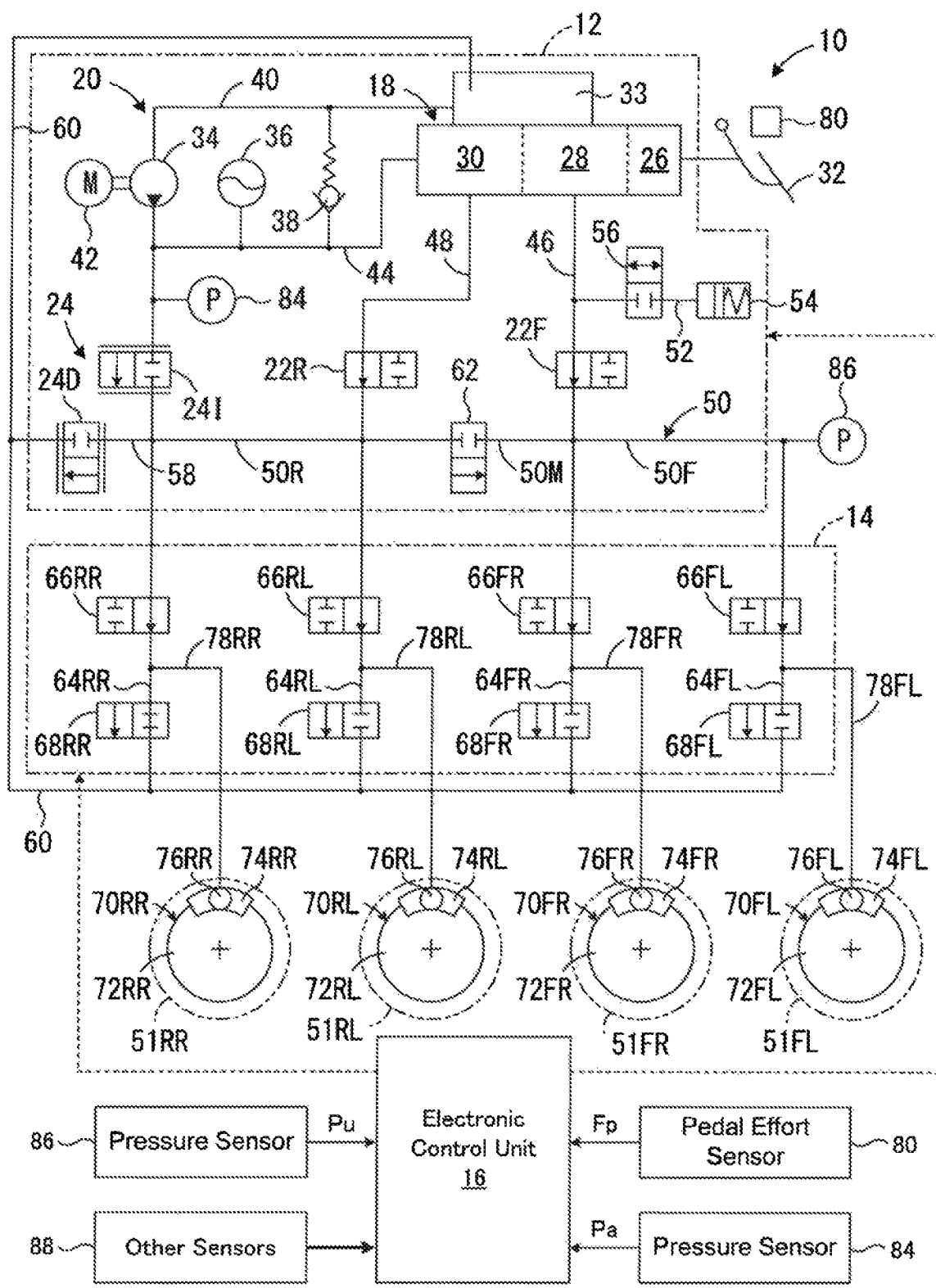
FIG. 1 is a schematic configuration diagram showing a first embodiment of a vehicle braking force apparatus for a vehicle according to the present disclosure.

As shown in FIG. 1, the braking force control apparatus 10 according to the first embodiment of the present disclosure comprises an upstream braking actuator 12, a downstream braking actuator 14, an electronic control unit 16 as a control unit that controls the upstream braking actuator and the downstream braking actuator. The upstream braking actuator 12 includes a master cylinder device 18 driven by braking operation of a driver, a hydraulic pressure supply source 20, master cut valves 22F and 22R, and an upstream pressure control valve 24. In FIG. 1, springs and solenoids of the valves are not shown for the purpose of simplification.

The master cylinder device 18 includes a booster 26, a master cylinder 28, and a regulator 30. A brake pedal 32 operated by the driver is connected to the booster 26, and a reservoir 33 for storing brake oil (not shown) as a working liquid is connected to the master cylinder 28 and the regulator 30. As is well known, a pressure of the regulator 30 is controlled to be substantially the same as a pressure in the master cylinder 28. Since the functions of the booster 26, the master cylinder 28 and the regulator 30 are well known by those skilled in the art, description thereof will be omitted.

The hydraulic pressure supply source 20 includes an oil pump 34, an accumulator 36 and a relief valve 38, but the accumulator may be omitted. The oil pump 34 is provided in a supply conduit 40 connected to the reservoir 33 at one end, and is driven by an electric motor 42 to pump up the brake oil from the reservoir 33 and discharge high pressure brake oil. A connection conduit 44 is connected between the supply conduit 40 on the discharge side of the oil pump 34 and the regulator 30, and the accumulator 36 is connected to the connection conduit 44. The relief valve 38 returns the brake oil in the connection conduit 44 to the supply conduit 40 on the side of the reservoir 33 with respect to the oil pump 34 when a pressure in the connection conduit 44 exceeds a preset relief pressure, whereby the pressure in the connecting conduit 44 is adjusted to be equal to or below the relief pressure.

The master cylinder 28 and the regulator 30 are connected to a supply conduit 50 common to left and right front wheels and left and right rear wheels provided in the downstream braking actuator 14 by a first supply conduit 46 and a second supply conduit 48, respectively. The master cut valves 22F and 22R are normally open electromagnetic on-off valves provided in the first supply conduit 46 and the second supply conduit 48, respectively. A stroke simulator 54 is connected to the first supply conduit 46 by a connection conduit 52, and a connection control valve 56, which is a normally closed electromagnetic on-off valve, is provided in the connection conduit 52. The connection control valve 56 is opened when the master cut valves 22F and 22R are closed, thereby allowing the driver to depress the brake pedal 32 and applying a depress reaction force to the driver via the brake pedal 32.

The upstream pressure control valve 24 includes a pressure increasing control valve 24I and a pressure reducing control valve 24D, which are normally closed electromagnetic differential pressure control valves. The other end of the supply conduit 40 is connected to the supply conduit 50, and the pressure increasing control valve 24I is provided in the supply conduit 40 on the discharge side of the oil pump 34. The supply conduit 50 is connected to a discharge conduit 60 connected to the reservoir 33 at one end by a connection conduit 58, and the pressure reducing control valve 24D is provided in the connection conduit 58. The pressure increasing control valve 24I and the pressure reducing control valve 24D may be linear solenoid valves configured to open as necessary when the master cut valves 22F and 22R are closed and each increase a valve opening amount as necessary as an energization amount to a solenoid not shown in the figure increases. As shown in FIG. 1, when the master cut valves 22F and 22R are opened and the pressure increasing control valve 24I, the pressure reducing control valve 24D and the connection control valve 56 are closed (non-control mode), the upstream braking actuator 12 sets an upstream pressure Pu to the pressure in the master cylinder 28.

When a valve opening amount of the pressure increasing control valve 24I increases, a flow rate of brake oil flowing from the hydraulic pressure supply source 20 through the supply conduit 40 to the supply conduit 50 increases, and a pressure in the supply conduit 50 increases (pressure increasing mode). On the other hand, when a valve opening amount of the pressure reducing control valve 24D increases, a flow rate of brake oil flowing from the supply conduit 50 to a discharge conduit 60 through the connection conduit 58 increases, and the pressure in the supply conduit 50 decreases (pressure reducing mode). Further, when the pressure increasing control valve 24I and the pressure reducing control valve 24D are in the closed state, the pressure in the supply conduit 50 does not change (pressure holding mode). Therefore, the upstream braking actuator 12 can control the upstream pressure Pu supplied from the upstream braking actuator to the downstream braking actuator in the pressure increasing mode, the pressure holding mode, and the pressure reducing mode in a state where the communication between the master cylinder device 18 and the downstream braking actuator 14 is cut off.

The supply conduit 50 includes a supply conduit 50F common to the left and right front wheels 51FL and 51FR and a supply conduit 50R common to the left and right rear wheels 51RL and 51RR, and a communication control valve 62 is provided in an intermediate supply conduit 50M between the supply conduits 50F and 50R. The communication control valve 62 is a normally closed electromagnetic on-off valve, which is opened when the master cut valves 22F and 22R are closed, thereby connects the supply conduit 50F common to the left and right front wheels and the supply conduit 50R common to the left and right rear wheels.

One ends of a left front wheel control conduit 64FL and a right front wheel control conduit 64FR are connected to the supply conduit 50F, and the other ends of these control conduits are connected to the discharge conduit 60. The control conduit 64FL is provided with a pressure increasing-holding valve 66FL and a pressure reducing valve 68FL for the left front wheel, and the control conduit 64FR is provided with a pressure increasing-holding valve 66FR and a pressure reducing valve 68FR for the right front wheel. Similarly, one ends of a left rear wheel control conduit 64RL and a right rear wheel control conduit 64RR are connected to the supply conduit 50R, and the other ends of these control conduits are connected to the discharge conduit 60. The control conduit 64RL is provided with a pressure increasing-holding valve 66RL and a pressure reducing valve 68RL for the left rear wheel, and the control conduit 64RR is provided with a pressure increasing-holding valve 66RR and a pressure reducing valve 68RR for the right rear wheel.

Although not shown in detail in FIG. 1, braking force generators 70FL and 70FR are provided corresponding to the left and right front wheels 51FL and 51FR, respectively, and braking force generators 70RL and TORR are provided corresponding to the left and right rear wheels 51RL and 51RR, respectively. The braking force generators 70FL to 70RR include brake disks 72FL to 72RR, respectively that rotate together with the corresponding wheels, and brake calipers 74FL to 74RR, respectively that press brake pads, not shown, against the corresponding brake disks. The brake calipers 74FL to 74RR include wheel cylinders 76FL to 76RR, respectively, and convert the braking pressures into braking forces by changing pressing forces of the brake pads against the brake discs according to pressures of the wheel cylinders, that is, braking pressures Pwfl to Pwrr, and generate braking forces corresponding to the braking pressures. Notably, the braking force generators may be drum type braking force generators.

One end of a supply/discharge conduit 78FL is connected to the control conduit 64FL between the pressure increasing-holding valve 66FL and the pressure reducing valve 68FL for the left front wheel, and the other end of the supply/discharge conduit 78FL is connected with the wheel cylinder 76FL of the braking force generator 70FL. One end of a supply/discharge conduit 78FR is connected to the control conduit 64FR between the pressure increasing-holding valve 66FR and the pressure reducing valve 68FR for the right front wheel, and the other end of the supply/discharge conduit 78FR is connected with the wheel cylinder 76FR of the braking force generator 70FR. One end of a supply/discharge conduit 78RL is connected to the control conduit 64RL between the pressure increasing-holding valve 66RL and the pressure reducing valve 68RL for the left rear wheel, and the other end of the supply/discharge conduit 78RL is connected with the wheel cylinder 76RL of the braking force generator 70RL. Further, one end of a supply/discharge conduit 78RR is connected to the control conduit 64RR between the pressure increasing-holding valve 66RR and the pressure reducing valve 68RR for the right rear wheel, and the other end of the supply/discharge conduit 78RR is connected with the wheel cylinder 76RR of the braking force generator 70RR.

As shown in FIG. 1, the downstream braking actuator 14 opens the pressure increasing-holding valves 66FL to 66RR and closes the pressure reducing valves 68FL to 68RR, thereby controlling the braking pressures Pwfl to Pwrr of the corresponding wheels in a pressure increasing mode. The downstream braking actuator 14 closes the pressure increasing-holding valves 66FL to 66RR and opens the pressure reducing valves 68FL to 68RR, thereby controlling the braking pressures Pwfl to Pwrr of the corresponding wheels in a pressure reducing mode. Further, the downstream braking actuator 14 closes the pressure increasing-holding valves 66FL to 66RR and closes the pressure reducing valves 68FL to 68RR, thereby controlling the braking pressures Pwfl to Pwrr of the corresponding wheels in a pressure holding mode.

In the embodiment, the pressure increasing-holding valves 66FL 66RR are normally open type electromagnetic on-off valves, and the pressure reducing valves 68FL to 66RR are normally closed type electromagnetic on-off valves. However, the pressure increasing-holding valve and the pressure reducing valve of each wheel may be replaced with one electromagnetic valve of a 3-port 3-position switching type capable of increasing, holding and reducing the braking pressure. Further, the pressure increasing-holding valves 66FL to 66RR may each be a linear solenoid valve configured such that a valve opening amount decreases as an energization amount to a solenoid increases.

The brake pedal 32 is provided with a pedal effort sensor 80 that detects a pedal effort Fp applied to the brake pedal by the driver. A signal indicating the pedal effort Fp detected by the pedal effort sensor 80 is input to the electronic control unit 16. The pedal effort Fp is a value that indicates an amount of braking operation performed by the driver. As an amount of braking operation performed by the driver, a master cylinder pressure Pm that is a pressure in the master cylinder 28 or a pressure in the first supply conduit 46 between the master cylinder and the master cut valve 22F may be detected.

A pressure sensor 84 that detects a pressure in the supply conduit 40 (accumulator pressure Pa) is connected to the supply conduit between the oil pump 34 and the pressure increasing control valve 24I. A pressure sensor 86 for detecting a pressure in the supply conduit 50F (upstream pressure Pu) is connected to the supply conduit. Signals indicating the accumulator pressure Pa and the upstream pressure Pu detected by the pressure sensors 84 and 86, respectively, are also input to the electronic control unit 16. The electronic control unit 16 also receives signals indicating various parameters relating to a running state of the vehicle such as a steering angle θ and a vehicle speed V from the other sensors 88.

The electronic control unit 16 may be, for example, a microcomputer having a CPU, a ROM, a RAM, and an input/output port device, which are connected to each other by a bidirectional common bus. In particular, the ROM stores a control program for the upstream braking actuator 12 corresponding to the flowchart shown in FIG. 2 and a control program for the downstream braking actuator 14 corresponding to the flowchart shown in FIG. 3. As will be described in detail later, the CPU controls the upstream braking actuator 12 according to the control program for the upstream braking actuator, and controls the downstream braking actuator 14 according to the control program for the downstream braking actuator.

As will be described in detail later, the electronic control unit 16 sets the control modes of the upstream braking actuator 12 and the downstream braking actuator 14 to the non-control modes when a braking force is not controlled by the anti-skid control for any of the wheels. Therefore, the upstream pressure Pu and the braking pressures Pbi (i=fl, fr, rl and rr) of the wheels are controlled to be the master cylinder pressure Pm.

In contrast to this, when a start condition for the braking force control by the anti-skid control is satisfied for any wheel, the electronic control unit 16 controls the braking force of the relevant wheel by the anti-skid control until an end condition is satisfied. That is, the electronic control unit 16 calculates a target braking pressure Pabsi (i=fl, fr, rl or rr) for keeping a braking slip ratio of the relevant wheel within a predetermined range. Further, the electronic control unit 16 controls the downstream braking actuator 14 in the pressure reducing mode, the pressure holding mode, the pressure increasing mode and the non-control mode so that the braking pressure Pbi (i=fl, fr, rl or rr) of the relevant wheel becomes the corresponding target braking pressure Pabsi. In this situation, the upstream pressure Pu and the braking pressures Pbi of wheels other than the relevant wheel are controlled to be the master cylinder pressure Pm.

Further, in the first embodiment, when a braking pressure cannot be reduced, such as when the pressure reducing valve of any wheel is kept closed and the valve cannot be opened, it is determined that the downstream braking actuator 14 is in a specific abnormality. Notably, in a braking force control apparatus in which a braking pressure is reduced by suction of an oil pump, it is determined that the downstream braking actuator 14 is in a specific abnormality even when the oil pump or an electric motor that drives the oil pump is abnormal.

When the downstream braking actuator 14 is in a specific abnormality, control of the upstream pressure Pu when the downstream braking actuator 14 is in a specific abnormality (referred to as "backup control") is performed according to the control program for the upstream braking actuator 12. That is, the target upstream pressure Put is determined according to the following equation (1) based on the target braking pressures Pbti of the wheels, and the upstream braking actuator 12 is controlled in the pressure reducing mode, the pressure holding mode, the pressure increasing mode and the non-control mode so that an upstream pressure Pu becomes the target upstream pressure Put.

$$\text{Target upstream pressure Put=LO (HI (left front wheel, right front wheel) HI (left rear wheel, right rear wheel))} \quad (1)$$

In the above equation (1), HI means that the higher one of the target braking pressures Pbti of the two wheels in the parentheses is selected, and LO means that the lower one of the target braking pressure Pbti of the two wheels in the parentheses is selected. When the two target braking pressures to be selected are the same, the same target braking pressure is selected.

Note that the target braking pressure Pbti is a braking pressure Pbi of the wheel, that is, the master cylinder pressure Pm, for each wheel that is not controlled by the anti-skid control, and is the target braking pressure Pabsi for each wheel on which the braking force is controlled by the anti-skid control. Further, when automatic braking control for driving assistance is performed as in automatic driving control in which braking is performed, the target braking pressure Pbti is a target braking pressure for automatic braking control for each wheel for which braking force control by anti-skid control is not performed, and is the target braking pressure Pabsi for each wheel for which braking force control by anti-skid control is performed.

<Control of the Upstream Braking Actuator 12>

Figure 2:
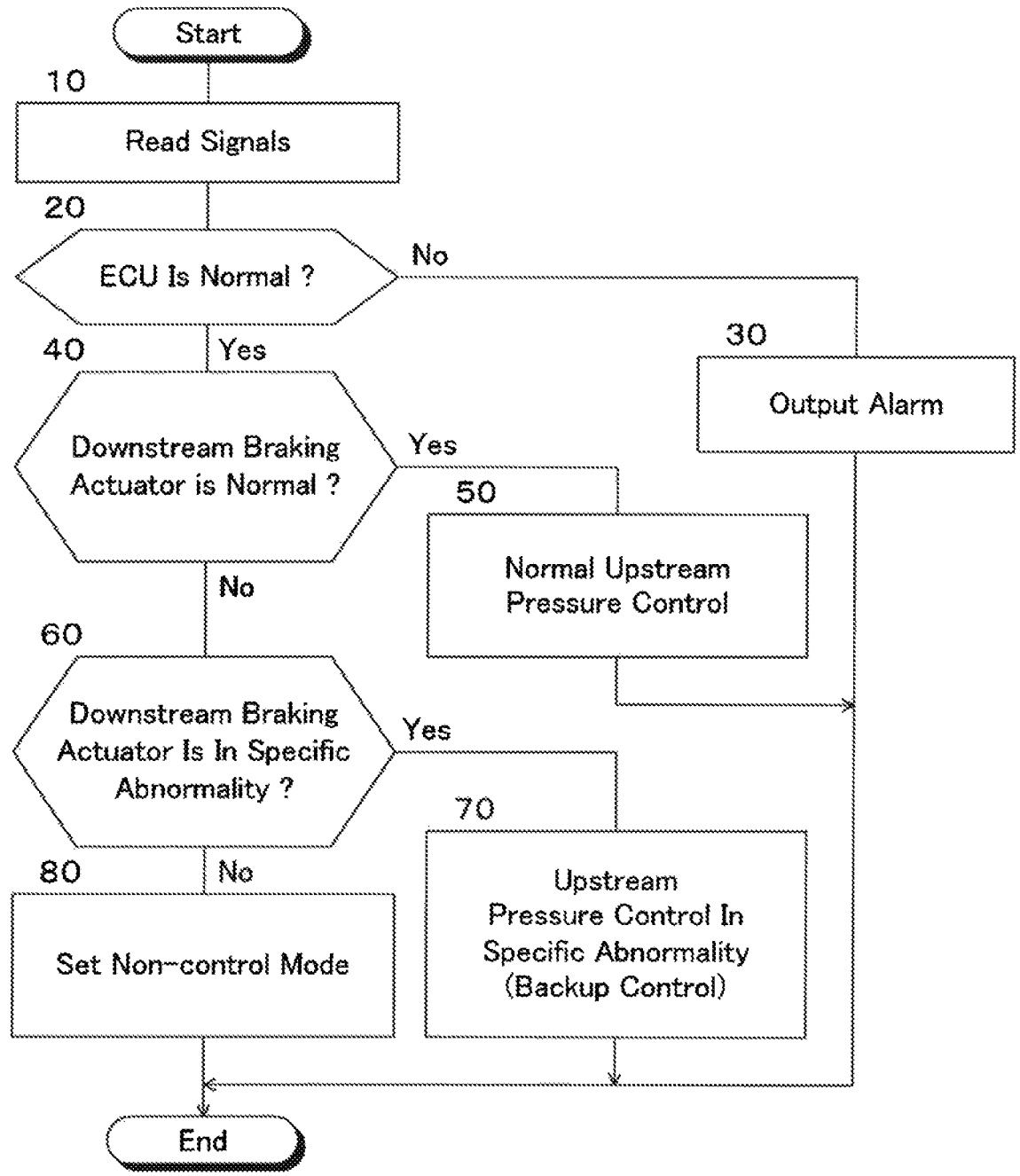
FIG. 2 is a flowchart showing a control routine of an upstream braking actuator in the first embodiment.

Next, the control routine of the upstream braking actuator 12 in the embodiment will be described with reference to the flowchart shown in FIG. 2. The control according to the flowchart shown in FIG. 2 is repeatedly executed at predetermined time intervals when an ignition switch (not shown) is ON. In the following description, the control of the upstream braking actuator according to the flowchart shown in FIG. 2 is simply referred to as "the upstream control".

First, in step 10, signals indicating a master cylinder pressure Pm detected by the pressure sensor 80 and the like are read. In step 20, a determination is made as to whether or not the electronic control unit 16 is normal. When an affirmative determination is made, the upstream control proceeds to step 40, and when a negative determination is made, the upstream control proceeds to step 30.

In step 30, an alarm device not shown in FIG. 1 is activated to output an alarm indicating that the electronic control unit 16 is abnormal.

In step 40, a determination is made as to whether or not the downstream braking actuator 14 is normal. When a negative determination is made, the upstream control proceeds to step 60, and when an affirmative determination is made, the upstream control proceeds to step 50. For example, when the pressure increasing-holding valve of any wheel is kept closed and not opened, when the pressure reducing valve is kept opened and not closed, or when the pressure reducing valve is kept closed and not opened, the downstream braking actuator 14 is determined not to be normal.

In step 50, the upstream pressure Pu is controlled normally. The upstream braking actuator 12 is controlled in the non-control mode by not supplying control current to the valves and the motor 42. That is, the master cut valves 22F and 22R are opened, and the connection control valve 56, the communication control valve 62, the pressure increasing control valve 24I, and the pressure reducing control valve 24D are kept closed. Furthermore, the pump 34 is stopped.

Therefore, the master cylinder pressure Pm is supplied to the downstream braking actuator 14 as the upstream pressure Pu.

In step 60, a determination is made as to whether or not the downstream braking actuator 14 is in a specific abnormality. When a negative determination is made, the upstream control proceeds to step 80, and when an affirmative determination is made, the upstream control proceeds to step 70.

In step 70, control of the upstream pressure Pu when the downstream braking actuator 14 is in a specific abnormality (backup control) is performed. That is, according to the above equation (1), higher one of the target braking pressures of the left and right front wheels and higher one of the target braking pressures of the left and right rear wheels are selected, and lower one of the two selected target braking pressures is determined as the target upstream pressure Put. Further, the upstream braking actuator 12 is controlled so that an upstream pressure Pu becomes the target upstream pressure Put. Note that an alarm device that is not shown in FIG. 1 may be activated to output an alarm indicating that the downstream braking actuator 14 is in a specific abnormality.

In step 80, as in step 50, the upstream braking actuator 12 is controlled in the non-control mode. Note that an alarm indicating that the downstream braking actuator 14 is in an abnormality other than a specific abnormality may be output by operating an alarm device not shown in FIG. 1.

<Control of Downstream Braking Actuator 14>

Figure 3:
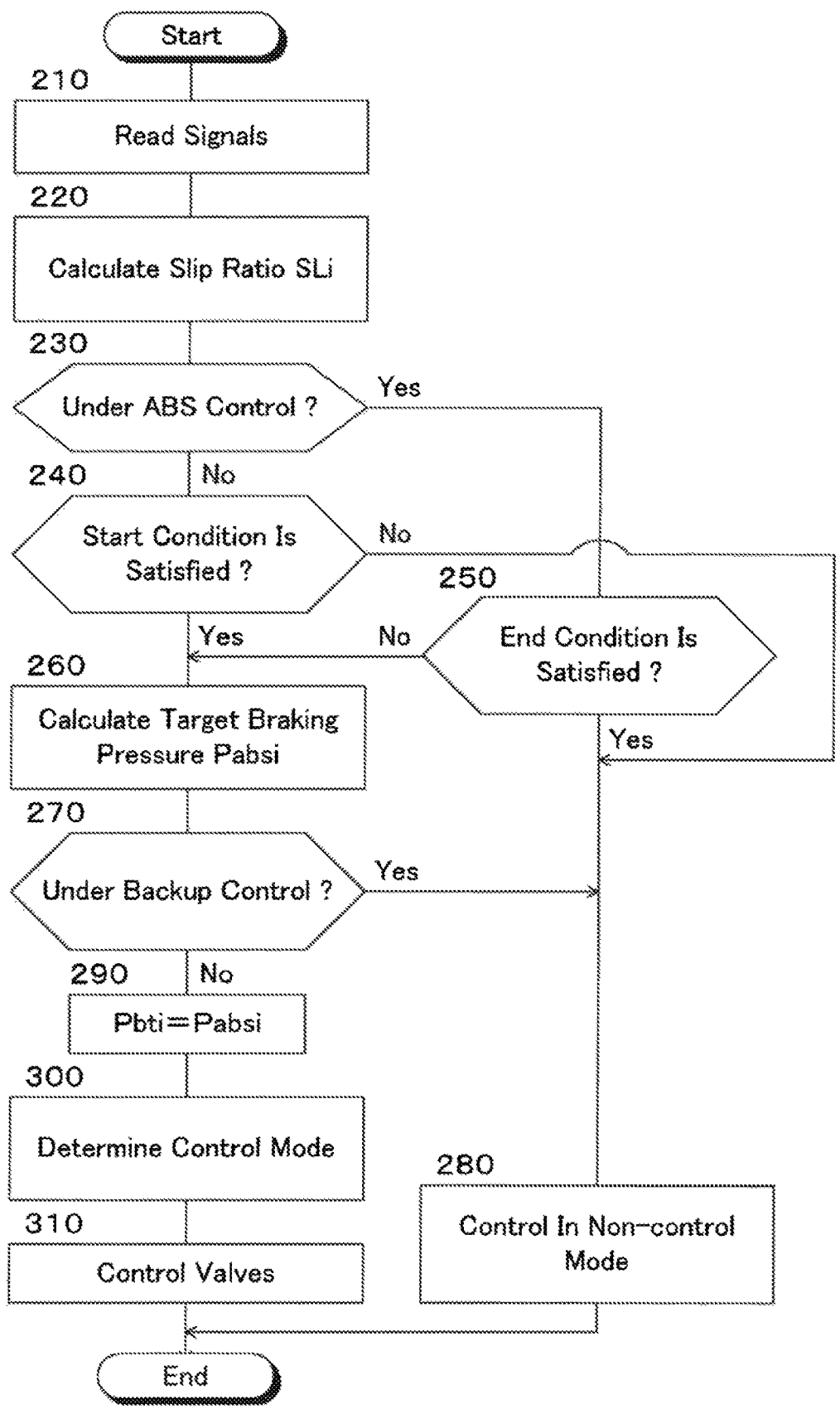
FIG. 3 is a flowchart showing a control routine of a downstream braking actuator in the first embodiment.

Next, a control routine for the downstream braking actuator 14 in the embodiment will be described with reference to the flowcharts shown in FIG. 3. The control according to the flowcharts shown in FIG. 3 is repeatedly executed in the order of, for example, the left front wheel 51FL, the right front wheel 51FR, the left rear wheel 51RL and the right rear wheel 51RR at predetermined time intervals when the ignition switch (not shown) is ON. In the following description, the control of the downstream braking actuator according to the flowcharts shown in FIG. 3 is simply referred to as "the downstream control".

First, in step 210, signals indicating wheel speeds Vwfl, Vwfr, Vwrl and Vwrr of the left front wheel 51FL, right front wheel 51FR, left rear wheel 51RL and right rear wheel 51RR detected by the wheel speed sensors and the like are read.

In step 220, an estimated vehicle body speed. Vb is calculated based on the wheel speeds Vwi (i=fl, fr, rl and rr) in a manner known in the art. In addition, a braking slip ratio SLi (i=fl, fr, rl or rr) of the relevant wheel is calculated based on the estimated vehicle body speed Vb and the wheel speed Vwi of the relevant wheel.

In step 230, a determination is made as to whether or not the braking force is being controlled by the anti-skid control for the relevant wheel. When an affirmative determination is made, the downstream control proceeds to step 250, and when a negative determination is made, the downstream control proceeds to step 240.

In step 240, a determination is made as to whether or not a start condition for starting braking force control by the anti-skid control is satisfied for the relevant wheel. For example, it is determined whether or not the estimated vehicle body speed Vb is equal to or greater than a control start reference value Vbs (a positive constant) and the braking slip ratio SLi of the relevant wheel is equal to or greater than a reference value SLo (a positive constant). When a negative determination is made, the downstream control proceeds to step 280, and when an affirmative determination is made, the downstream control proceeds to step 260.

In step 250, a determination is made as to whether or not an end condition for terminating braking force control by the anti-skid control is satisfied for the relevant wheel. For example, it is determined that the end condition is satisfied when the estimated vehicle body speed Vb is equal to or lower than a control end reference value Vbe (a positive constant) or when the master cylinder pressure Pm is equal to or lower than a control end pressure reference value (a positive constant). When a negative determination is made, the downstream control proceeds to step 260, and when an affirmative determination is made, the downstream control proceeds to step 280.

In step 260, the target braking pressure Pabsi (i=fl, fr, rl or rr) of the relevant wheel for setting the braking slip ratio to a value within a predetermined range is calculated based on the braking slip ratio SLi of the relevant wheel in a manner known in the art.

In step 270, a determination is made as to whether or not backup control is being performed, that is, whether or not the upstream pressure Pu is being controlled when the downstream braking actuator 14 is in a specific abnormality. When a negative determination is made, the downstream control proceeds to step 290, and when an affirmative determination is made, the downstream control proceeds to step 280.

In step 280, the downstream braking actuator 14 is controlled in the non-control mode. That is, the pressure increasing-holding valve 66FL, 66RR, 66RL or 66RR of the relevant wheel is controlled to the open position, and the pressure reducing valve 68FL, 68RR, 68RL or 68RR of the relevant wheel is controlled to the closed position. Therefore, when no braking force is controlled by anti-skid control for any of the wheels, the braking pressure Pbi of the relevant wheel is controlled to the master cylinder pressure Pm. On the other hand, when it is necessary to control the braking force by anti-skid control for any of the wheels, the braking pressure Pbi of the other wheels are controlled to the target upstream pressure Put.

In step 290, the target braking pressure Pbti of the relevant wheel is set to the target braking pressure Pabsi of the wheel calculated in step 260 (target braking pressure for anti-skid control).

In step 300, a determination is made as to whether the control mode for setting the braking pressure Pbi of the relevant wheel to the corresponding target braking pressure Pbti is the pressure increasing mode, the pressure holding mode, or the pressure reducing mode.

In step 310, the pressure increasing-holding valve 66FL, 66RR, 66RL or 66RR or the pressure reducing valve 68FL 68RR, 68RL or 68RR of the wheel to be controlled based on the control mode is specified. Further, a target duty ratio Dti (i=fl, fr, rl or rr) of a valve to be controlled is calculated based on a present braking pressure Pbi and the target braking pressure Pbti of the relevant wheel, and by controlling the valves according to the target duty ratio Dti, the braking pressure Pbi of the relevant wheel is controlled to be the corresponding target braking pressure Pbti. The present braking pressure Pbi may be estimated based on, for example, a history of increasing decreasing of the braking pressure.

Operation of First Embodiment

Next, the operation of the braking force control apparatus 10 according to the first embodiment will be described in the following various cases.

<A. When the Downstream Braking Actuator 14 is Normal (the Backup Control is not Performed)>

An affirmative determination is made in step 40, so that the upstream braking actuator 12 is controlled in the non-control mode in step 50, and the master cylinder pressure Pm is supplied to the downstream braking actuator 14.

<A1> when the Braking Slip of the Relevant Wheel is not Excessive

In steps 230 and 240, negative determinations are made. In step 280, the downstream braking actuator 14 is controlled in the non-control mode, so that the braking pressure Pbi of the wheel is controlled to be the master cylinder pressure Pm.

<A2> when the Braking Slip of the Relevant Wheel is Excessive

First, a negative determination and an affirmative determination are made in steps 230 and 240, respectively, and then an affirmative determination and a negative determination are performed in steps 230 and 250, respectively, thereby steps 260, 270 and 290 to 310 are executed. In step 260, a target braking pressure Pabsi (a target braking pressure for the anti-skid control) for controlling the braking slip ratio SLi of the relevant wheel within a predetermined range is calculated based on the braking slip ratio.

In steps 270, a negative determination is made, and in step 290, the target braking pressure Pbti of the relevant wheel is set to the target braking pressure Pabsi for the anti-skid control of the relevant wheel. In steps 300 and 310, the braking pressure Pbi of the relevant wheel is controlled so as to become the target braking pressure Pbti (=Pabsi), thereby reducing the braking slip of the relevant wheel. The braking pressures of the other wheels are controlled to the master cylinder pressure Pm as in the case of A1.

<B. When the Downstream Braking Actuator 14 is in a Specific Abnormality (the Backup Control is being Performed)>

Since a negative determination and an affirmative determination are made in steps 40 and 60, respectively, the upstream pressure control (the backup control) to be executed when the relevant wheel is in a specific abnormality is performed in step 70. That is, the target upstream pressure Put is determined according to the above equation (1), and the upstream braking actuator 12 is controlled so that the upstream pressure Pu becomes the target upstream pressure Put.

<B1> when the Braking Slip of the Relevant Wheel is not Excessive

As in the case of A1, negative determinations are made in steps 230 and 240. Therefore, the downstream braking actuator 14 is controlled in the non-control mode in step 280, so that the braking pressure Pbi of the relevant wheel is controlled to the master cylinder pressure Pm.

<B2> when the Brake Slip of the Relevant Wheel is Excessive

As in the case of A2, steps 260, 270 and 290 to 310 are executed. The braking pressures of the other wheels are controlled to the master cylinder pressure Pm as in the case of B1.

C. When the Downstream Braking Actuator 14 is in Another Abnormality>

In steps 40 and 60, negative determinations are made, and in step 80, the upstream braking actuator 12 is controlled in the non-control mode. Therefore it is possible to ensure a situation in which the wheel cylinders 76FL to 76RR are connected with the master cylinder device 18 as much as possible such that the braking pressures of the other wheels becomes the master cylinder pressure Pm, and the braking forces of the other wheels change corresponding to an amount of braking operation performed by the driver.

Second Embodiment

Figure 4:
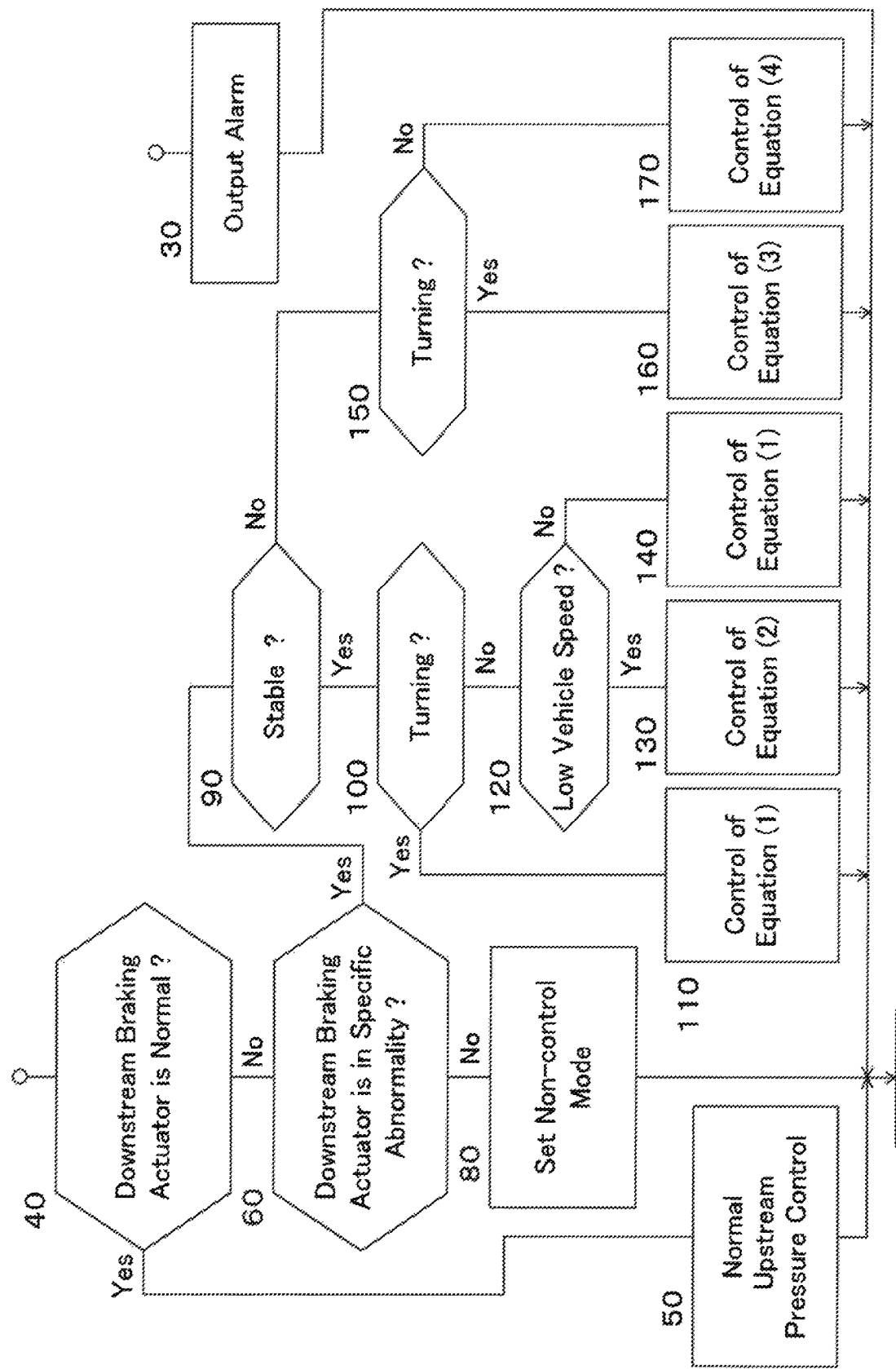
FIG. 4 is a flowchart showing a control routine of an upstream braking actuator in a second embodiment omitting a part of the control routine.

FIG. 4 is a flowchart showing the control routine of the upstream braking actuator 12 in the second embodiment of the braking force control apparatus according to the present disclosure, omitting a part of the control routine. In FIG. 4, the same step numbers as those shown in FIG. 2 are assigned to the same steps as those shown in FIG. 2. Notably, the downstream braking actuator 14 is controlled according to the flowchart shown in FIG. 3 as in the first embodiment. Therefore, illustration and explanation of the flowchart of the control of the downstream braking actuator are omitted.

In the second embodiment, steps 10 to 60 and step 80 are executed in the same manner as in the first embodiment. Notably, when an affirmative determination is made in step 60, that is, when it is determined that the downstream braking actuator 14 is in the specific abnormality, the upstream control proceeds to step 90 instead of step 70.

In step 90, based on a deviation between a reference yaw rate of the vehicle and an actual yaw rate, for example, a determination is made as to whether or not the vehicle is in a stable running state in a manner known in the art. When a negative determination is made, the upstream control proceeds to step 150, and when an affirmative determination is made, the upstream control proceeds to step 100.

In step 100, a determination is made as to whether or not the vehicle is turning based on, for example, a magnitude of an actual yaw rate of the vehicle. When a negative determination is made, the upstream control proceeds to step 120, and when an affirmative determination is made, the upstream control proceeds to step 110.

In step 110, according to the above-mentioned equation (1), higher one of the target braking pressures of the left and right front wheels and higher one of the target braking pressures of the left and right rear wheels are selected, and lower one of the two selected target braking pressures is determined as the target upstream pressure Put. Furthermore, the upstream pressure Pu is controlled so that an upstream pressure Pu becomes the target upstream pressure Put.

In step 120, a determination is made as to whether or not a vehicle speed is low, for example, by determining whether or not a vehicle speed V is equal to or less than a reference value V0 (a positive constant). When a negative determination is made, the upstream control proceeds to step 140, and when an affirmative determination is made, the upstream control proceeds to step 130.

In step 130, according to the following equation (2), higher one of the target braking pressures of the left and right front wheels and higher one of the target braking pressures of the left and right rear wheels are selected, and higher one of the two selected target braking pressures is determined as the target upstream pressure Put. Furthermore, the upstream pressure Pu is controlled so that an upstream pressure Pu becomes the target upstream pressure Put.

$$\text{Target upstream pressure Put} = \text{HI (HI (left front wheel, right front wheel), HI (left rear wheel, right rear wheel))} \quad (2)$$

In step 140, as in step 110, a target upstream pressure Put is determined according to the above-mentioned equation (1). Furthermore, an upstream pressure Pu is controlled so that the upstream pressure Pu becomes the target upstream pressure Put.

In step 150, similarly to step 100, a determination is made as to whether or not the vehicle is turning based on, for example, a magnitude of an actual yaw rate. When a negative determination is made, the upstream control proceeds to step 170, and when an affirmative determination is made, the upstream control proceeds to step 160.

In step 160, according to the following equation (3), lower one of the target braking pressures of the left and right front wheels and lower one of the target braking pressures of the left and right rear wheels are selected, and lower one of the two selected target braking pressures is determined as the target upstream pressure Put. Furthermore, an upstream pressure Pu is controlled so that an upstream pressure Pu becomes the target upstream pressure Put.

$$\text{Target upstream pressure Put=LO (LO (left front wheel, right front wheel), LO (left rear wheel, right rear wheel))} \quad (3)$$

In step 170, according to the following equation (4), lower one of the target braking pressures of the left and right front wheels and higher one of the target braking pressures of the left and right rear wheels are selected, and lower one of the two selected target braking pressures is determined as the target upstream pressure Put. Furthermore, an upstream pressure Pu is controlled so that an upstream pressure Pu becomes the target upstream pressure Put.

$$\text{Target upstream pressure Put=LO (LO (left front wheel, right front wheel), HI (left rear wheel, right rear wheel))} \quad (4)$$

Operation of Second Embodiment

Next, the operation of the braking force control apparatus 10 according to the second embodiment will be described with respect to various cases which are in a situation where the downstream braking actuator 14 is in the specific abnormality. The operation in a situation where the downstream braking actuator 14 is normal and in a situation where the downstream braking actuator 14 is in another abnormality are the same as those of the first embodiment.

<When the Vehicle Runs Stably without Turning and it is not at Low Speed>

A positive determination is made in step 90 and negative determinations are made in steps 100 and 120. Accordingly, in step 140, a target upstream pressure Put is determined according to the above-mentioned equation (1), and an upstream pressure Pu is controlled so that the upstream pressure Pu becomes the target upstream pressure Put.

The target upstream pressure Put is determined by selecting higher one of the target braking pressures of the left and right front wheels and higher one of the target braking pressures of the left and right rear wheels, and selecting lower one of the two selected target braking pressures. Therefore, similar to <When Downstream Braking actuator 14 is in Specific Abnormality> in the first embodiment, as compared to where the upstream pressure Pu is not controlled, it is possible to reduce a possibility that the braking slips of the wheels become excessive in a situation where a driver's braking operation amount is excessive. Further, it is possible to reduce a possibility that the stability of the vehicle deteriorates due to an excessive braking force of the entire vehicle while satisfying a braking request of the driver as much as possible.

<When the Vehicle Runs Stably without Turning and is at Low Speed>

An affirmative determination is made in step 90, a negative determination is made in step 100, and an affirmative determination is made in step 120. Accordingly, in step 130, a target upstream pressure Put is determined according to the above equation (2), and an upstream pressure Pu is controlled so that the upstream pressure Pu becomes the target upstream pressure Put.

The target upstream pressure Put is determined by selecting higher one of the target braking pressures of the left and right front wheels and higher one of the target braking pressures of the left and right rear wheels, and selecting higher one of the two selected target braking pressures. Therefore, the braking force of the entire vehicle can be increased and a braking request of the driver can effectively be satisfied as compared to where the target upstream pressure Put is determined according to, for example, the above-mentioned equation (1). Since the vehicle is running stably without turning, even if the braking force of the entire vehicle is high, the stability of the vehicle does not deteriorate.

<When the Vehicle is Turning in a Stable Running State>

Affirmative determinations are made in steps 90 and 100. Accordingly, in step 110, as in step 140, a target upstream pressure Put is determined according to the above-mentioned equation (1), and an upstream pressure Pu is controlled so that the upstream pressure Pu becomes the target upstream pressure Put.

Therefore, it is possible to increase the braking forces of the rear wheels and to reduce a possibility that a braking request of the driver is not satisfied as compared to where higher one of the target braking pressures of the left and right front wheels and lower one of the target braking pressures of the left and right rear wheels are selected. Notably, since the vehicle is turning stably and lower one of the two selected target braking pressures is selected, selection of higher one of the target braking pressures of the left and right rear wheels does not deteriorate the stable turning state of the vehicle.

<When the Vehicle is Turning in an Unstable Running State>

A negative determination is made in step 90 and an affirmative determination is made in step 150. Therefore, in step 160, a target upstream pressure Put is determined according to the above-mentioned equation (3), and an upstream pressure Pu is controlled so that the upstream pressure Pu becomes the target upstream pressure Put.

The target upstream pressure Put s determined by selecting lower one of the target braking pressures of the left and right front wheels and lower one of the target braking pressures of the left and right rear wheels, and selecting lower one of the two selected target braking pressures. Therefore, it is possible to reduce the braking forces of the rear wheels and to reduce a possibility of further deteriorating the running stability when the vehicle is turning as compared to where the target upstream pressure Put is determined in accordance with, for example, the above-mentioned equation (4).

<When the Vehicle is Running in an Unstable Running State and is not Turning>

Negative determinations are made in steps 90 and 150. Therefore, in step 170, a target upstream pressure Put is determined according to the above-mentioned equation (4), and an upstream pressure Pu is controlled so that the upstream pressure Pu becomes the target upstream pressure Put.

The target upstream pressure Put is determined by selecting lower one of the target braking pressures of the left and right front wheels and higher one of the target braking pressures of the left and right rear wheels, and selecting lower one of the two selected target braking pressures. Therefore, it is possible to increase the braking forces of the rear wheels and to effectively satisfy a braking request of the driver as compared to where the target upstream pressure Put is determined in accordance with, for example, the above-mentioned equation (3). Since the vehicle is traveling in an unstable traveling state but is not turning, there is little possibility that the running stability of the vehicle further deteriorates even if the braking forces of the rear wheels are increased.

As can be understood from the above description, according to the second embodiment, in addition to obtaining the same operational effect as the first embodiment when the vehicle travels stably without turning and is not at low speed and when the vehicle turns stably, it is possible to optimally control the upstream pressure Pu in accordance with a running condition of the vehicle.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, in step 260, a target braking pressure Pabsi for anti-skid control of a wheel to be controlled is calculated, and the downstream braking actuator 14 is controlled so that the braking pressure Pbi of the relevant wheel becomes the target braking pressure Pabsi. However, a control mode and a target increase/decrease gradient of the braking pressure for obtaining the brake slip ratio within a predetermined range based on the braking slip ratio SLi of the wheel to be controlled may be obtained, and a target braking pressure Pbti of the relevant wheel may be calculated based on the control mode and the target increase/decrease gradient.

In the above-described first and second embodiments, the upstream braking actuator 12 and the downstream braking actuator 14 are controlled by the electronic control unit 16. However, the upstream braking actuator 12 and the downstream braking actuator 14 may each be controlled by a respective electronic control unit. In that case, the controls of the upstream pressure according to the flowcharts shown in FIGS. 2 and 4 are performed by an electronic control unit for the upstream braking actuator 12, and the control of the braking pressure according to the flowchart shown in FIG. 3 is performed by an electronic control unit for the downstream braking actuator 14.

Further, in the above-described second embodiments, determinations of steps 90, 100, 120 and 150 are performed, and steps 110, 130, 140, 160 and 170 are executed according to the determination results. However, any one of the determinations of steps 90, 100, 120 and 150 may be skipped and the corresponding steps 90, 100, 120 or 150 may be omitted. For example, step 120 may be omitted and the upstream pressure control may proceed to step 140 when a negative determination is made in step 100.

Further, in the above-described first and second embodiments, the upstream pressure control valve 24 includes a pressure increasing control valve 24I and a pressure decreasing control valve 24D. However, the pressure increasing control valve 24I and the pressure decreasing control valve 24D may be replaced by a valve device of three-port three-position switching type which controls the communication and the degree of communication between the supply conduit 50R and both the supply conduit 40 and the discharge conduit 60.

Further, in the above-described first and second embodiments, the upstream braking actuator 12 includes a master cylinder device 18, a hydraulic pressure supply source 20, master cut valves 22F and 22R, and an upstream pressure control valve 24. However, as described in, for example, Japanese Patent Application Laid-Open Publication No. 2017-52305, the upstream braking actuator 12 may be an upstream braking actuator of back pressure control type which can control the upstream pressure Pu by controlling the back pressure of the master cylinder 28 and the regulator 30.

Further, in the above-described first and second embodiments, pressure reduction of the braking pressures is performed by opening the pressure decreasing valves 68FL to 68RR and returning the oil to the reservoir 33. However, the pressure decreasing valves may be opened and the oil may be sucked by the oil pump.

Further, in the above-described first and second embodiments, the upstream braking actuator 12 and the downstream braking actuator 14 have the front wheel system and the rear wheel system, these actuators may have a front left and rear right system and a front right and rear left system.

Further, in the above-described second embodiment, in step 110, higher one of the target braking pressures of the left and right front wheels and higher one of the target braking pressures of the left and right rear wheels are selected. However, higher one of the target braking pressures of the left and right front wheels and lower one of the target braking pressures of the left and right rear wheels are selected may be selected.

What is claimed is:

1. A braking force control apparatus for a vehicle which has an upstream braking actuator that includes a master cylinder device driven by braking operation of a driver and is configured to generate an upstream pressure common to left and right front wheels and left and right rear wheels, a downstream braking actuator that is configured to individually control braking pressures supplied to braking force generators of the left and right front wheels and the left and right rear wheels using the upstream pressure, and a control unit that controls the upstream braking actuator and the downstream braking actuator;

the control unit is configured to normally control the upstream braking actuator such that the upstream pressure becomes a pressure in the master cylinder device, and control the downstream braking actuator such that braking pressures of the wheels become a target braking pressure equal to the upstream pressure; and the control unit is configured to, when an anti-skid control start condition is satisfied for any of the wheels perform anti-skid control for controlling the downstream braking actuator such that a braking pressure of the relevant wheel becomes a target braking pressure of the anti-skid control for keeping a degree of braking slip of the relevant wheel within a predetermined range until an anti-skid control end condition is satisfied, wherein the control unit is configured to, when a specific abnormality occurs in the downstream braking actuator in which the upstream pressure can be supplied from the upstream braking actuator to the braking force generators of the wheels but a braking pressure of any wheel cannot be reduced, perform backup control in which the control unit selects higher one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure.

2. The braking force control apparatus for a vehicle according to claim 1, wherein the control unit is configured to select lower one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is unstable and the vehicle is not turning.

3. The braking force control apparatus for a vehicle according to claim 1, wherein the control unit is configured to select lower one of the target braking pressures of the left and right front wheels and lower one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is unstable and the vehicle is turning.

4. The braking force control apparatus for a vehicle according to claim 1, wherein the control unit is configured to select higher one of the target braking pressures of the left and right front wheels and higher one of the target braking pressures of the left and right rear wheels, determines lower one of the two selected target braking pressures as a backup target upstream pressure, and controls the upstream braking actuator such that the upstream pressure becomes the backup target upstream pressure when a running state of the vehicle is stable and the vehicle is turning.

5. The braking force control apparatus for a vehicle according to claim 1, wherein the control unit is configured to select higher one of the target braking pressures of the left and right front wheels and higher one of the target braking pressures of the left and right rear wheels, determines higher one of the two selected target braking pressures as a backup target upstream pressure, and controls the upstream braking actuator such that the upstream pressure becomes the backup target upstream pressure when a running state of the vehicle is stable, the vehicle is not turning and a vehicle speed is equal to or lower than a reference value.

6. The braking force control apparatus for a vehicle according to claim 1, wherein the control unit is configured to select higher one of the target braking pressures of the left and right front wheels and higher one of the target braking pressures of the left and right rear wheels, determines lower one of the two selected target braking, pressures as a backup target upstream pressure, and controls the upstream braking actuator such that the upstream pressure becomes the backup target upstream pressure when a running state of the vehicle is stable, the vehicle is not turning and a vehicle speed is higher than a reference value.

7. The braking force control apparatus for a vehicle according to claim 1, wherein the upstream braking actuator includes a hydraulic pressure supply source, master cut valves, and an upstream pressure control valve in addition to the master cylinder device, and the upstream pressure control valve is configured to increase the upstream pressure by supplying hydraulic liquid from the hydraulic pressure supply source to the downstream braking actuator when increasing the upstream pressure, to hold the upstream pressure by shutting off a communication between the hydraulic pressure supply source and the downstream braking actuator when holding the upstream pressure, and to decrease the upstream pressure by discharging hydraulic liquid from the downstream braking actuator to the hydraulic pressure supply source when decreasing the upstream pressure.

* * * * *